United States Patent
Budinger et al.

(10) Patent No.: US 6,187,450 B1
(45) Date of Patent: Feb. 13, 2001

(54) TIP CAP HOLE BRAZING AND OXIDATION RESISTANT ALLOY THEREFOR

(75) Inventors: David E. Budinger, Loveland; Ronald L. Galley, Mason; Roger D. Wustman, Loveland; Jonathan P. Clarke, West Chester, all of OH (US)

(73) Assignee: General Electric Company, Cincinnati, OH (US)

( * ) Notice: Under 35 U.S.C. 154(b), the term of this patent shall be extended for 0 days.

(21) Appl. No.: 09/435,788

(22) Filed: Nov. 8, 1999

Related U.S. Application Data

(60) Provisional application No. 60/160,682, filed on Oct. 21, 1999.

(51) Int. Cl.⁷ .............................. B32B 15/16; B64C 11/29
(52) U.S. Cl. ..................... 428/546; 428/680; 416/97 A; 416/97 R; 228/248.1
(58) Field of Search ..................................... 428/680, 546; 29/889.1; 75/255; 416/241 R, 97 A, 97 R; 228/248.1

(56) References Cited

U.S. PATENT DOCUMENTS

| | | |
|---|---|---|
| 3,759,692 | 9/1973 | Zelahy . |
| 4,169,742 | 10/1979 | Wukusick et al. . |
| 4,478,638 * | 10/1984 | Smith, Jr. et al. . |
| 4,910,098 * | 3/1990 | Lee et al. . |
| 5,086,968 * | 2/1992 | Fawley et al. . |
| 5,173,255 | 12/1992 | Ross et al. . |
| 5,182,080 * | 1/1993 | Beltran et al. . |
| 5,232,343 * | 8/1993 | Butts . |
| 5,240,491 * | 8/1993 | Budinger et al. . |
| 5,395,584 * | 3/1995 | Berger et al. . |
| 5,666,643 * | 9/1997 | Chesnes et al. . |
| 5,735,448 * | 4/1998 | Draghi et al. . |
| 5,902,421 * | 5/1999 | Christy . |
| 5,916,518 * | 6/1999 | Chesnes . |

OTHER PUBLICATIONS

STN Search Results for AMS 4782, Mar. 15, 2000.
Statement Concerning B93, Mar. 2000.

* cited by examiner

Primary Examiner—Deborah Jones
Assistant Examiner—Jason Savage
(74) Attorney, Agent, or Firm—Andrew C. Hess; Gerry S. Gressel

(57) ABSTRACT

A tip cap hole is loaded with a first composition comprising particles of a first alloy having a solidus temperature above the brazing temperature. The first composition is covered with a second composition comprising particles of a second alloy having a liquidus temperature below the brazing temperature. The second composition is heated to the brazing temperature to cause particles of the second alloy to melt to form a liquid of the second alloy which is carried into spaces between the particles of the first alloy by capillarity. The liquid of the second alloy is cooled to form a solid securely bonding the particles of the first alloy. By weight, the second alloy has no more than 1% B and from 3% to 11% Si. The first alloy has Cr and at least about 5% Al, at least about 0.5% Hf, no more than 0.5% Ti.

12 Claims, 6 Drawing Sheets

TIP CAP HOLE BRAZING AND OXIDATION RESISTANT ALLOY THEREFOR

This application claims the benefit of provisional application 60/160,682 filed Oct. 21, 1999.

BACKGROUND OF THE INVENTION

This invention relates to a brazing method for closing holes and, more particularly, to a brazing method and alloy for closing high pressure turbine blade tip cap holes to maximize filling of the holes, minimize porosity, improve oxidation resistance, and improve reliability.

During the manufacture of high pressure turbine blades of the type as shown in U.S. Pat. No. 5,232,343, tip cap holes are formed to locate casting cores. It is important to securely close such holes because otherwise cooling air leaks out of the tip rather than being directed over airfoil surfaces. The tip cap holes have a diameter on the order of 0.04 to 0.05 inch (about 0.1 cm to 0.13 cm). Heretofore such holes have been filled by injection with a 50% dense slurry of a fill alloy consisting of a relatively high melting point ("high melt") component (H1) (about 45 wt %) intermixed with a relatively low melting point ("low melt") component (L1) (about 55 wt %). The compositions of high melt and low melt components employed in prior practice are as follows:

| High Melt Comp. (H1) | | Low Melt Comp. (L1) | |
|---|---|---|---|
| C | 0.15–0.19 wt % | C | 0.05 max wt % |
| Cr | 13.7–14.3 | Cr | 14.8–15.8 |
| Co | 9.0–10.0 | Co | 9.5–11.0 |
| Ti | 4.8–5.2 | Ta | 3.0–3.8 |
| Al | 2.8–3.2 | Al | 3.2–3.7 |
| W | 3.7–4.3 | B | 2.1–2.5 |
| Mo | 3.7–4.3 | Ni | Balance |
| W + Mo | 7.7 min | Plus incidental impurities | |
| Ni | Balance | | |
| Plus incidental impurities | | | |

During brazing the low melt component particles melt to a liquid and, upon solidification, densify and bond the high melt component particles in the tip cap hole. A disadvantage of this approach has been that the cooled filling has a high internal porosity level which results in susceptibility to oxidation in service, and that a lack of fill condition exists due to a meniscus-type void that has formed upon cooling.

BRIEF SUMMARY OF THE INVENTION

Briefly, in accordance with this invention, a tip cap hole is loaded with a first composition comprising particles of a first alloy having a solidus temperature above the brazing temperature. The first composition is covered with a second composition comprising particles of a second alloy having a liquidus temperature below the brazing temperature. The second composition is heated to the brazing temperature to cause particles of the second alloy to melt to form a liquid of the second alloy which is carried into spaces between the particles of the first alloy by capillarity. The liquid of the second alloy is cooled to form a solid securely bonding the particles of the first alloy.

Other features of the present invention will be in part apparent and in part pointed out hereinafter.

DETAILED DESCRIPTION OF THE PREFERRED EMBODIMENT

In accordance with this invention, tip cap holes are brazed closed with a two-component brazing material at a particular brazing temperature at which just one of the two components of the material melts. Tip cap holes are injected at least about 80% full, preferably completely full, with a first composition which comprises a high melt material having a solidus temperature greater than the brazing temperature used for subsequent brazing. Injection is accomplished using a hollow needle with air pressure behind it or by other suitable means. A relatively equal amount of a second composition comprising low melt material is then applied to the top of the high melt component. The low melt material has a liquidus temperature lower than the brazing temperature. At the brazing temperature, therefore, the low melt material melts while the high melt material does not.

Figure 1:
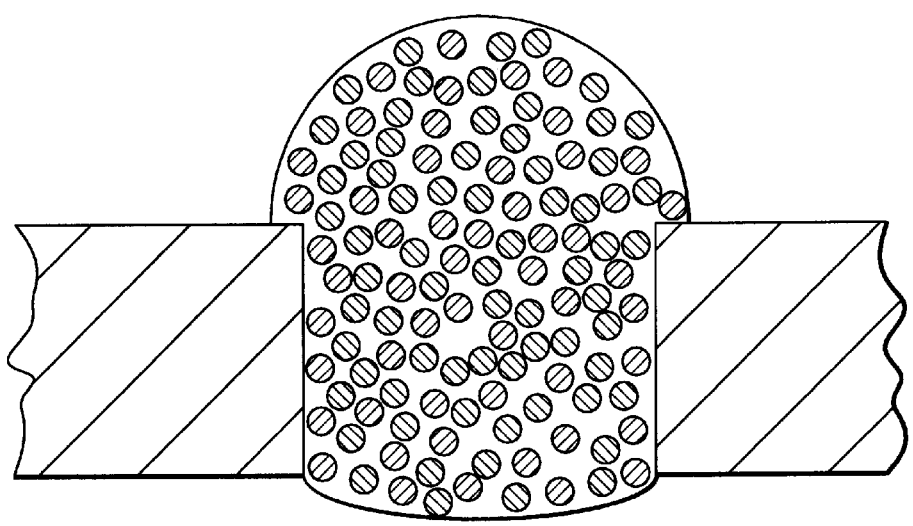
FIG. 1 is a schematic cross section of a tip cap hole illustrating a prior art method for filling tip cap holes.
Figure 2:
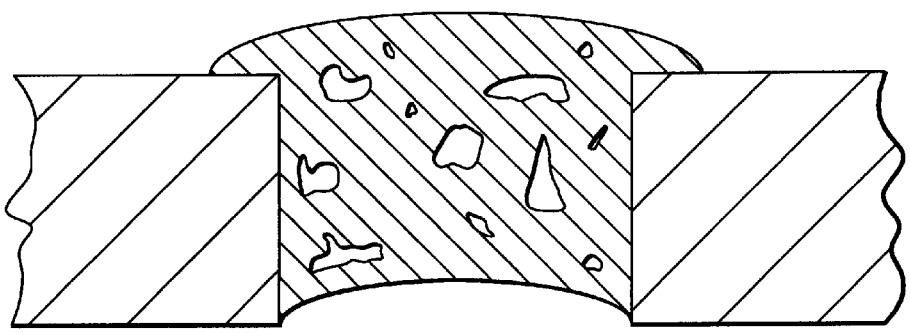
FIG. 2 is a schematic cross section of a tip cap hole after filling by the prior art method.
Figure 3:
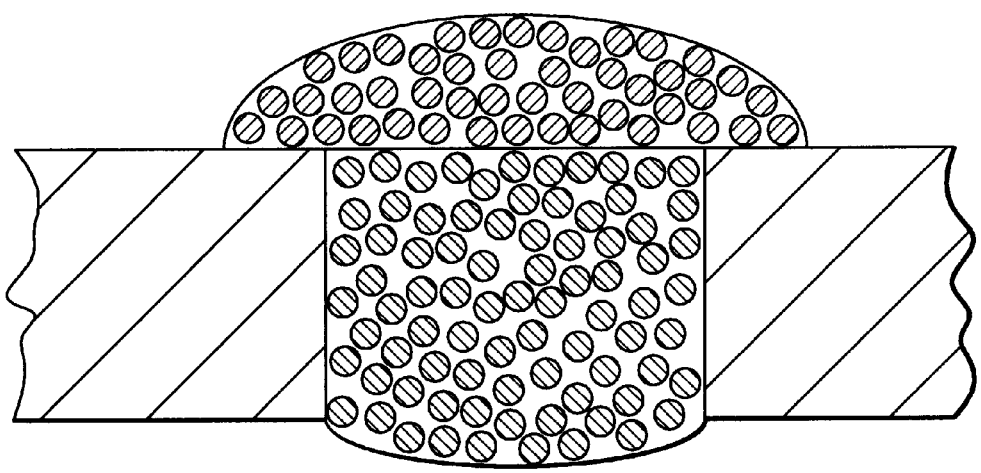
FIG. 3 is a schematic cross section of a tip cap hole illustrating the filling method of the invention.
Figure 4:
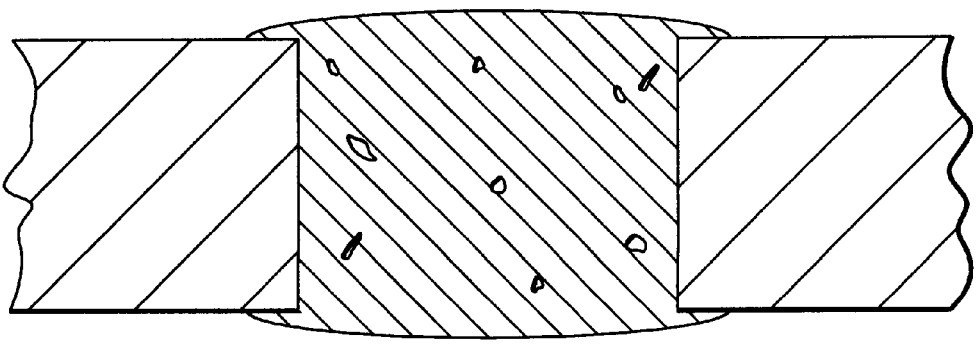
FIG. 4 is a schematic cross section of a tip cap hole after filling by the method of the invention.

FIG. 3 is a cross section of a tip cap hole after filling with powder and before brazing which illustrates the hole filled with high melt component and with the low melt component applied to the top of the high melt component, the two components forming two distinct layers. This is contrasted with the prior art method illustrated in FIG. 1 which shows the high melt component initially intermixed with the low melt component. The high melt and low melt components are shown with different cross-hatching in these figures. Returning to FIG. 3, it can be appreciated that during brazing according to the invention, the low melt component particles melt and the low melt component moves downward through all of the high melt component particles as a result of capillarity and gravity. The result upon solidification is a hole which is substantially 100% filled (FIG. 4) as compared to a hole filled (FIG. 2) under the prior approach. FIG. 2 illustrates the detrimental meniscus effect which occurs at the bottom of holes filled by the prior method, which effect is avoided with the invention as illustrated in FIG. 4. The resulting filled holes are fuller as a result of the new brazing method, and are more resistant to oxidation as a result of the new brazing method in combination with the new alloy.

In one preferred embodiment of the invention which is a variation from the technique described above, the low melt component applied to the top of the filled hole is intermixed with a portion of high melt component. Because the high melt component has greater oxidation resistance than the low melt component, this aspect enhances the oxidation resistance at the top of the filled tip cap hole. Furthermore, the high melt component particles intermixed with the low melt particles do not melt and do not wick down into the high melt material below. Thus the intermixed high melt particles have a build up effect which minimizes meniscus formation at the top of the filled hole during brazing. Accordingly, the hole is injected completely with high melt component and then a mixture of high melt and low melt component is applied on top of the high melt component. This mixture preferably comprises on the order of up to about 50% by weight of the high melt component, more preferably about 10% to about 50% by weight of the high melt component, still more preferably about 10% to about 25% by weight of the high melt component. In one particularly preferred embodiment, this mixture comprises about 15% of the high melt component and about 85% of the low melt component. The weight ratio of low melt to high melt component in this mixture is between about 1:1 and about 9:1, preferably between about 3:1 and about 9:1. In one particularly preferred embodiment, this weight ratio is between about 5:1 and about 6:1.

The liquidus temperature of the low melt material is lower than the brazing temperature, and preferably no higher than about 2200° F. (about 1200° C.), more preferably no higher than about 2175° F. (about 1190° C.). In one preferred embodiment, the liquidus temperature of the low melt material is between about 2000° F. (about 1090° C.) and about 2200° F. (about 1200° C.). Specific preferred embodiments have liquidus temperatures of about 2065° F. (about 1130° C.) and about 2165° F. (about 1185° C.), respectively. The solidus temperature of the high melt material is greater than the brazing temperature and is preferably no less than about 2300° F. (about 1260° C.), more preferably no less than about 2375° F. (about 1300° C.). In one preferred embodiment, the solidus temperature of the high melt material is between about 2350° F. (about 1285° C.) and about 2450° F. (about 1345° C.).

A water-based binder such as one available under the trade name Vitta Gel from Vitta Corp. of Bethel, Conn., is preferably mixed with each of the high and low melt materials to help hold them in place prior to brazing. The ratio of binder to metal is on the order of about 1:7 by weight, such that the materials are contained within an approximately 50% dense slurry after some evaporation occurs. The binder volatilizes upon brazing.

It has been discovered that improved oxidation resistance achieved in accordance with this invention is enhanced by selection of a low melt material which has a significant content of Si as a melting point depressant in a Ni- or Co-based matrix. Silicon has been found to be especially advantageous in such applications because it enhances oxidation resistance. Accordingly, the low melt alloy of the invention contains at least about 3% Si, and preferably between about 4% and about 11% Si. One preferred embodiment contains between about 3% and about 5% Si, more preferably between about 4.2% and about 4.8% Si. Another preferred embodiment contains between about 9% and about 11% Si, more preferably between about 9.8% and about 10.3% Si.

The low melt alloy of the invention is further characterized by a lack of intentionally added B, and by maintaining the incidental B content below about 1%, preferably below about 0.5%, more preferably below about 0.1%. It has been discovered that, inasmuch as B has deleterious effects on oxidation resistance, minimizing B enhances oxidation resistance. In contrast, prior low melt brazing alloys for use in tip cap hole filling applications have had a significant amount (e.g., at least about 2%) of B as a melting point depressant.

The low melt component of the invention further comprises Cr in the range of about 10% to about 25% to enhance oxidation resistance.

The high melt alloy of the invention contains Cr and Al for oxidation resistance. It preferably contains at least about 5%, preferably from about 5% to about 7%, more preferably from about 5.5% to about 6.5% Al, which provides an Al oxide scale which imparts enhanced oxidation resistance.

It has been discovered that the performance of the fill material is further enhanced by using a high melt further containing Hf, preferably at least about 0.5%, more preferably about 1% to about 3%, most preferably from about 1% to about 2% Hf, to enhance the adherence of oxidation resistant Al and Cr oxide scales.

It has also been discovered that such performance is enhanced if the high melt also contains Re, at least about 1%, preferably from about 2% to about 4% Re due to its effect as a solid solution strengthener, particularly because Re does not have as deleterious an effect on oxidation resistance as other solid solution strengtheners such as Mo, Ta and W.

And it has further been discovered that by eliminating intentional additions of Ti, and by maintaining Ti content preferably below about 0.5%, the protective Cr and Al oxide scales adhere better, because Ti has a tendency to interfere with such adherence.

Exemplary high melt and low melt compositions in accordance with this invention are as follows:

| High Melt Comp. HA | | Low Melt Comp. LA | | Low Melt Comp. LB | |
|---|---|---|---|---|---|
| C | 0.10–0.14 wt % | C | 0.13–0.19 wt % | C | 0.01 max |
| Hf | 1.3–1.7 | Si | 4.2–4.8 | Si | 9.8–10.3 |
| Re | 2.6–3.0 | Cr | 13.7–14.3 | Cr | 18.5–19.5 |
| Cr | 6.6–7.0 | Co | 9.0–10.0 | B | 0.03 max |
| Ta | 6.2–6.5 | Ti | 4.6–5.2 | Ni | Balance plus incid. impurities |
| Al | 5.94–6.3 | Al | 2.8–3.2 | | |
| W | 4.7–5.0 | Mo | 3.7–4.3 | | |
| Mo | 1.3–1.7 | W | 3.7–4.3 | | |
| Co | 11.45–12.05 | B | 0.5–0.8 | | |
| Ti | 0.2 max | Ni | Balance plus incidental impurities | | |
| Ni | Balance plus incidental impurities | | | | |

The following examples further illustrate the invention.

EXAMPLE 1

Figure 5:
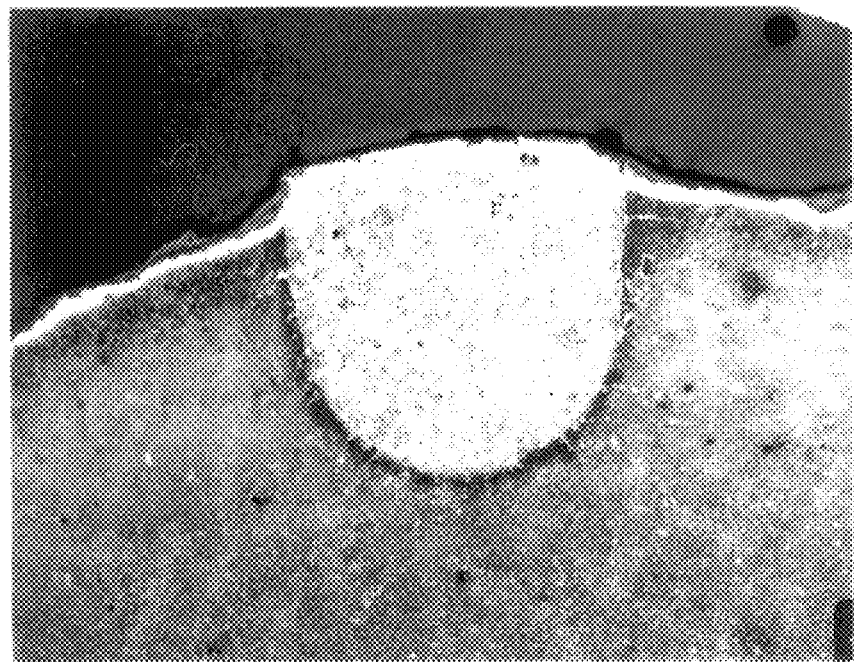
FIGS. 5 through 10 are 50× magnification photomicrographs of cross sections of samples after an oxidation test.
Figure 6:
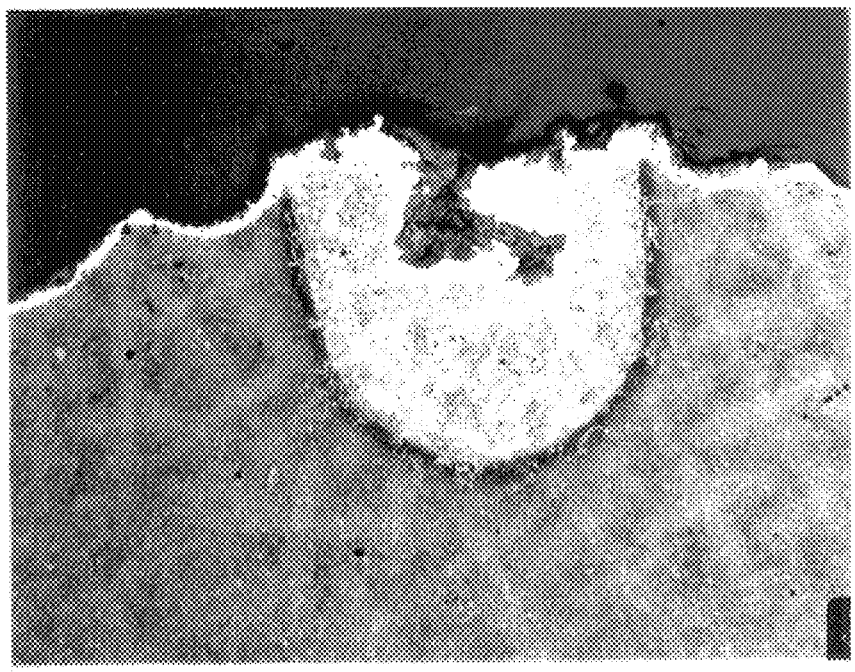
Figure 7:
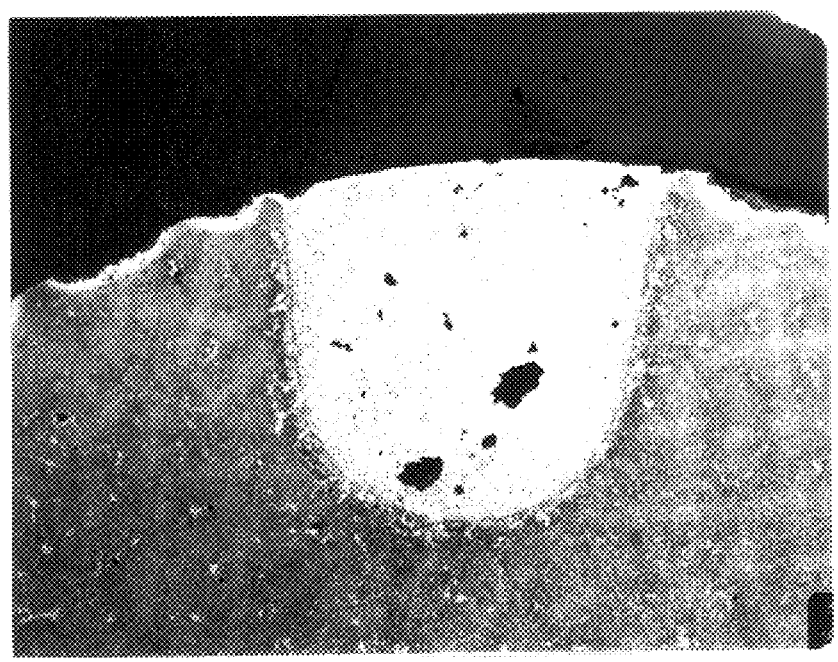
Figure 8:
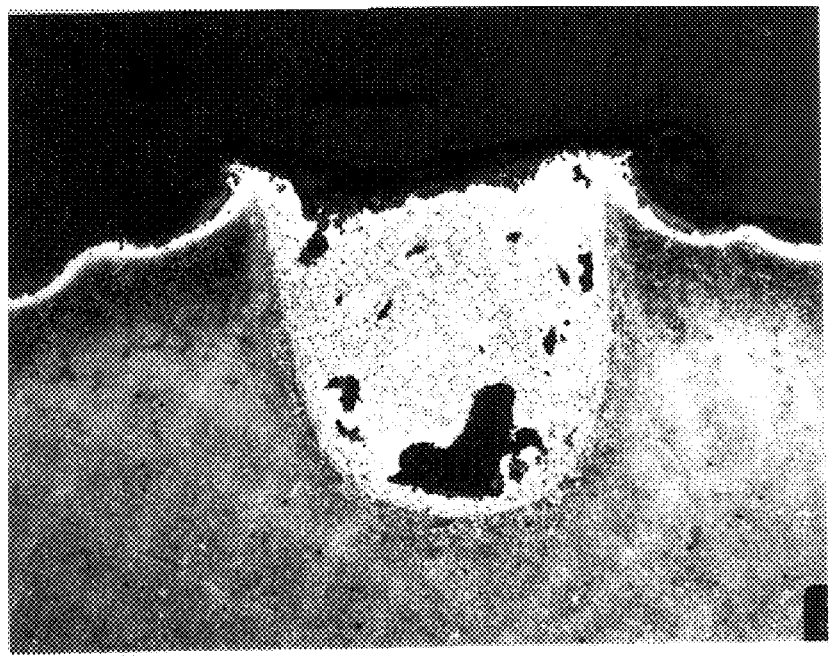
Figure 9:
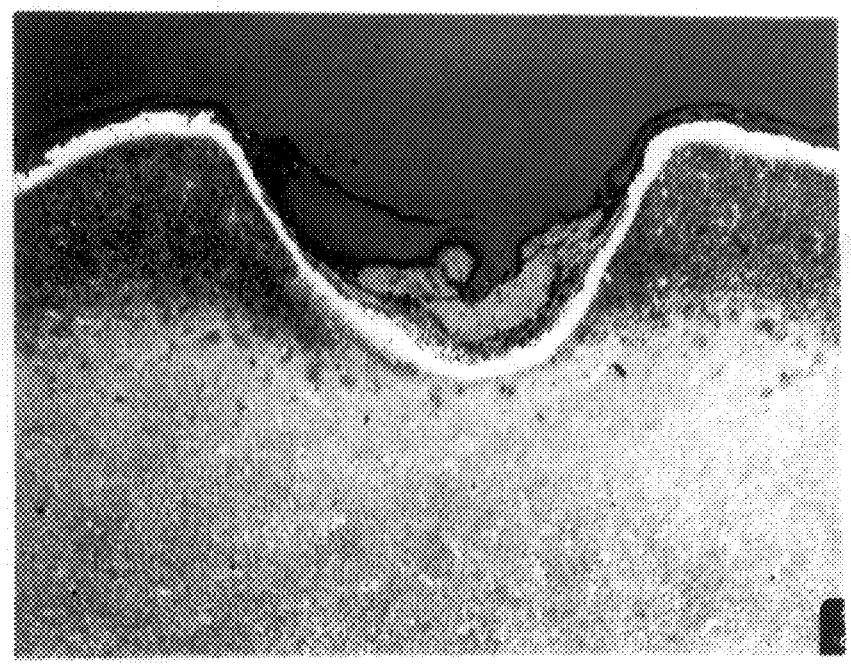
Figure 10:
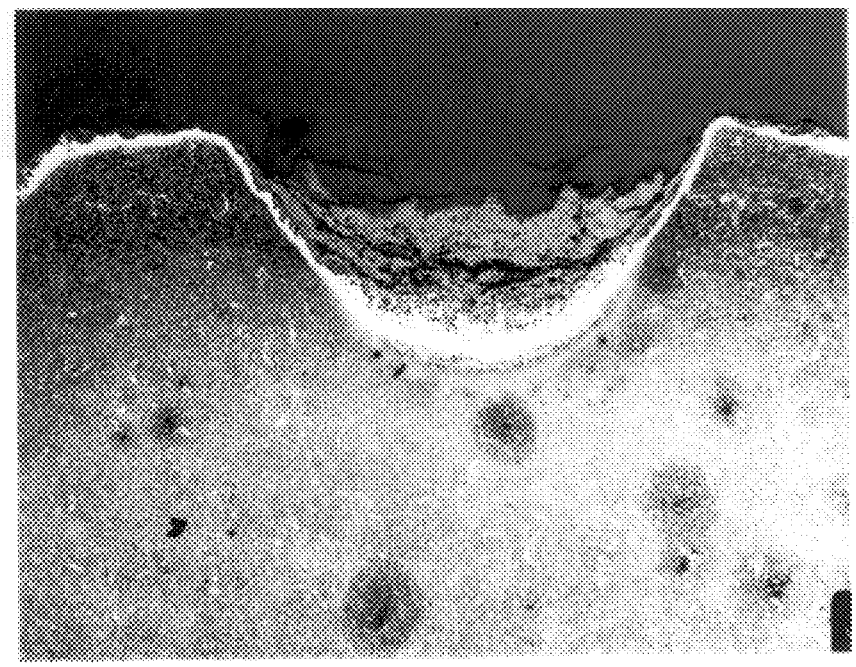

Cyclic oxidation tests were conducted comparing samples filled with the high melt/low melt mixtures of the invention (HA/LA and HA/LB) to samples filled with the prior high melt/low melt mixtures (H1/L1). Cyclic oxidation tests were conducted at up to 2000° F. with a five-minute hold time for up to 2400 cycles. Comparison of the photomicrographs of FIGS. 5 through 10 reveals that the fill material HA/LA (FIGS. 5 and 6) and HA/LB (FIGS. 7 and 8) suffered substantially less oxidative attack than the fill material H1/L1 (FIGS. 9 and 10). After 1800 cycles the HA/LA (FIG. 5) and HA/LB (FIG. 7) mixtures showed virtually no oxidative attack while the H1/L1 (FIG. 9) was nearly completely oxidized away. After 2400 cycles the HA/LA (FIG. 6) and HA/LB (FIG. 8) mixtures showed only minimal oxidative surface attack while the H1/L1 (FIG. 10) mixture was nearly completely oxidized away.

The actual maximum temperatures at which each of the tested mixtures showed acceptable levels of attack were recorded and are presented in Table 1.

TABLE 1

| Mixture | Cycles | Maximum Temperature (F) of Acceptable Oxidative Attack |
|---|---|---|
| H1/L1 (50/50) | 1800 | 1500–1600 |
| | 2400 | 1600 |
| HA/LA (50/50) | 1800 | 2000 |
| | 2400 | 1900 |
| HA/LB | 1800 | 2000 |
| | 2400 | 1700–1800 |

EXAMPLE 2

Tensile strength tests were performed according to the procedures of ASTM E8 and E21 to compare samples prepared according to the invention with samples prepared according to the prior method. The results are presented in Table 2.

TABLE 2

| Test # | Material | UTS | % EL |
|---|---|---|---|
| 1900° F. Tensile | | | |
| T36 | H1/L1 | 19900 | 1.70 |
| T37 | H1/L1 | 19700 | 1.40 |
| T3 | HA/LB** | 18300 | 1.20 |
| T4 | HA/LB** | 16600 | 1.50 |
| T15 | HA/LA** | 36500 | 0.70 |
| T16 | HA/LA** | 36200 | 0.90 |
| T25 | HA/LA* | 13600 | 0.70 |
| T26 | HA/LA* | 16700 | 0.60 |
| 2000° F. Tensile | | | |
| T38 | H1/L1 | 11200 | 1.00 |
| T39 | H1/L1 | 7600 | 1.00 |
| T5 | HA/LB** | 5500 | 1.90 |
| T6 | HA/LB** | 4500 | 2.50 |
| T17 | HA/LA** | 19400 | 1.00 |
| T18 | HA/LA** | 19300 | 0.70 |
| T27 | HA/LA* | 7400 | 1.00 |
| T28 | HA/LA* | 7300 | 0.80 |

*Blended mixtures **HA Filled joints w/braze on top

It can be seen from these data that the HA/LA combinations performed best, and that the tests performed on samples prepared according to the brazing method of the invention (braze on top) performed better than tests performed on samples prepared using blended mixtures.

EXAMPLE 3

Comparative 2000° F. stress rupture tests were conducted according to the procedure of ASTM E139 and the results presented in Table 3.

TABLE 3

| Test # | Material | KSI | Life | % EL |
|---|---|---|---|---|
| T40 | H1/L1 | 1 | 1141.3 | 7.2 |
| T41 | H1/L1 | 1 | 1106.4 | |
| T7 | HA/LB** | 1 | 685.3 | |
| T8 | HA/LB** | 1 | 211 | |
| T19 | HA/LA** | 1 | 414.5 | |
| T20 | HA/LA** | 1 | 371.8 | |
| T29 | HA/LA* | 1 | 54.2 | 2.10 |
| T30 | HA/LA* | 1 | 35 | 1.80 |
| T42 | H1/L1 | 2 | 15.3 | 2.50 |
| T43 | H1/L1 | 2 | 14.9 | 1.90 |
| T9 | HA/LB** | 2 | 5.3 | 8.70 |
| T10 | HA/LB** | 2 | 1.1 | 5.40 |
| T21 | HA/LA** | 2 | 27.9 | 2.20 |
| T22 | HA/LA** | 2 | 19.7 | 1.80 |
| T31 | HA/LA* | 2 | 29.3 | 2.70 |
| T32 | HA/LA* | 2 | 6.7 | 1.50 |

*Blended mixtures **HA Filled joints w/braze on top

These data reveal that at 1 ksi load all samples performed adequately and that at 2 ksi load the HA/LA samples prepared using the brazing method of the invention performed best.

EXAMPLE 4

Comparative nil strength tests were conducted as a measure of the highest use temperature and the results are presented in Table 4. These tests involved hanging a 300 psi dead weight load from a flat sheet sample. The sample is hung within a clam-shell furnace and the temperature is monitored. The temperature is increased and the temperature at which the bar breaks is recorded.

TABLE 4

| Test # | Material | Load (psi) | Temp (Deg. F) |
|---|---|---|---|
| T-1 | HA/LB** | 300 | 2103.8 |
| T-2 | HA/LB** | 300 | 2096.3 |
| T-12 | HA/LA** | 300 | 2122 |
| T-23 | HA/LA* | 300 | 2104.7 |
| T-24 | HA/LA* | 300 | 2086.9 |
| T-34 | H1/L1 | 300 | 2033.4 |
| T-35 | H1/L1 | 300 | 2045.6 |

*Blended mixtures **HA Filled joints w/braze on top

These data reveal that the average nil strength temperature of specimens prepared using the alloys and method of the invention was 2107.4° F. as compared to 2039.5° F. for specimens prepared using the prior alloy and method.

In view of the foregoing examples it is evident that the brazing method of the invention with either of the new material combinations tested (HA/LA and HA/LB) provides a more oxidation resistant product with acceptable mechanical properties as compared to the prior method. While in some instances the mechanical strength appears to be less with the new method and materials, in all instances the mechanical strength is acceptable for tip cap hole fill applications. The material must have sufficient strength to hold itself against centrifugal force and thermal loading during service, but it bears no further significant load. The more important characteristic for this application is oxidation resistance. The mechanical strength and oxidation resistance are attributed in large part to the relatively low amount of void space in the fill material, as shown in FIGS. 11 and 12.

Figure 11:
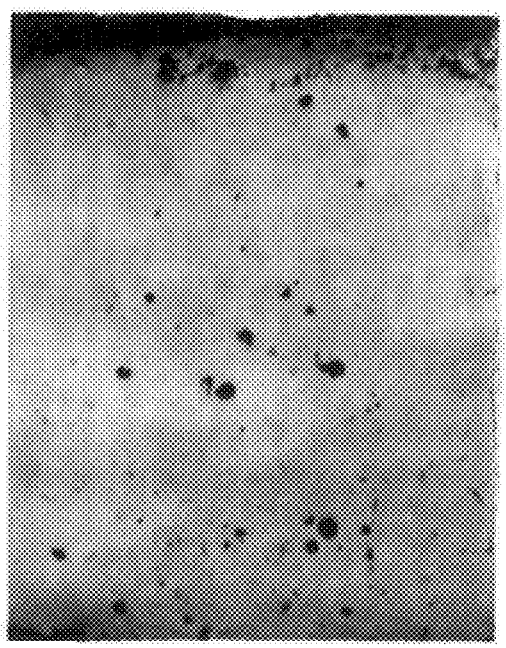
FIGS. 11 and 12 are photomicrographs of the fill material of the invention.
Figure 12:
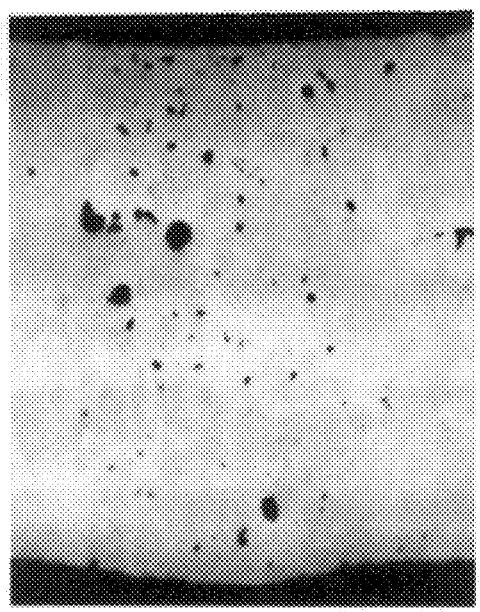

FIG. 11 shows a hole filled using the method of the invention with material HA followed by an 85/15 mixture of LA/HA; FIG. 12 shows a hole filled using the same method with material HA followed by LB.

As various changes could be made in the above constructions without departing from the scope of the invention, it is intended that all matter contained in the above description or shown in the accompanying drawings shall be interpreted as illustrative and not in a limiting sense.

What is claimed is:

1. A metal fill material in a tip cap hole in a high pressure turbine blade, the fill material comprising a first alloy component and a second alloy component, the first alloy component forming a first fill material layer consisting substantially entirely of said first alloy component and the second alloy component forming a second fill material layer distinct from said first fill material layer, said second fill material layer consisting at least about 50% by weight of said second alloy component, the first alloy component having a solidus temperature which is relatively higher than a liquidus temperature of said second alloy component, the second alloy component comprising from about 3% to about 11% Si by weight.

2. The fill material of claim 1 wherein the second alloy component is a Ni-based alloy which comprises Cr and no more than about 1% B by weight, and wherein the first alloy component is a Ni-based alloy which comprises Cr and at least about 5% Al by weight, at least about 1% Re by weight, at least about 0.5% Hf by weight, and no more than about 0.5% Ti by weight.

3. The fill material of claim 1 wherein said second fill material layer consists of from about 50% to about 90% by weight of said second alloy component and from about 10% to about 50% by weight of said first alloy component.

4. The fill material of claim 3 wherein said second fill material layer has a weight ratio of said second alloy component to said first alloy component of from about 3:1 to about 9:1.

5. A metal fill material in a tip cap hole in a high pressure turbine blade, the fill material comprising a first alloy component and a second alloy component, the first alloy component forming a first fill material layer consisting substantially entirely of said first alloy component and the second alloy component forming a second fill material layer distinct from said first fill material layer, said second fill material layer consisting at least about 50% by weight of said second alloy component, the first alloy component having a solidus temperature which is relatively higher than a liquidus temperature of said second alloy component, the second alloy component comprising no more than about 1% B by weight.

6. The fill material of claim 5 wherein the second alloy component is a Ni-based alloy which comprises Cr and from about 3% to about 11% Si by weight, and wherein the first alloy component is a Ni-based alloy which comprises Cr and at least about 5% Al by weight, at least about 1% Re by weight, at least about 0.5% Hf by weight, and no more than about 0.5% Ti by weight.

7. The fill material of claim 5 wherein said second fill material layer consists of from about 50% to about 90% by weight of said alloy component and from about 10% to about 50% by weight of said first alloy component.

8. The fill material of claim 7 wherein said second fill material layer has a weight ratio of said second alloy component to said first alloy component of from about 3:1 to about 9:1.

9. A Ni-based metal fill material in a tip cap hole in a high pressure turbine blade, the fill material comprising a first Ni-based alloy component and a second Ni-based alloy component, the first Ni-based alloy component forming a first fill material layer consisting substantially entirely of said first Ni-based alloy component and the second Ni-based alloy component forming a second fill material layer distinct from said first fill material layer, said second fill material layer consisting at least about 50% by weight of said second Ni-based alloy component, the first Ni-based alloy component having a solidus temperature which is relatively higher than a liquidus temperature of said second Ni-based alloy component, the first Ni-based alloy component comprising from about 5% to about 7% Al by weight, from about 1% to about 3% Hf by weight, from about 2% to about 4% Re by weight, no more than about 0.5% Ti by weight, and Cr, and the second Ni-based alloy component comprising from about 3% to about 11% Si by weight, no more than about 1% B by weight, and Cr.

10. The Ni-based fill material of claim 9 wherein said second fill material layer consists of from about 50% to about 90% by weight of said second Ni-based alloy component and from about 10% to about 50% by weight of said first Ni-based alloy component.

11. The Ni-based fill material of claim 10 wherein said second fill material layer has a weight ratio of said second Ni-based alloy component to said first Ni-based alloy component of from about 3:1 to about 9:1.

12. A Ni-based metal fill material in a tip cap hole in a high pressure turbine blade, the fill material comprising a first Ni-based alloy component and a second Ni-based alloy component, the first Ni-based alloy component having a solidus temperature which is relatively higher than a liquidus temperature of said second Ni-based alloy component, the first Ni-based alloy component comprising from about 5% to about 7% Al by weight, from about 1% to about 3% Hf by weight, from about 2% to about 4% Re by weight, no more than 0.5% Ti by weight, and Cr, the first Ni-based alloy component forming a first fill material layer consisting substantially entirely of said first Ni-based alloy component and the second Ni-based alloy component forming a second fill material layer distinct from said first fill material layer, said second fill material layer consisting at least about 50% by weight of said second Ni-based alloy component, wherein the second Ni-based alloy component is selected from the group of alloys consisting of A and B as follows, be weight %:

| A) | |
| --- | --- |
| C | 0.13–0.19 |
| Si | 4.2–4.8 |
| Cr | 13.7–14.3 |
| Co | 9.0–10.0 |
| Ti | 4.6–5.2 |
| Al | 2.8–3.2 |
| Mo | 3.7–4.3 |
| W | 3.7–4.3 |
| B | 0.5–0.8 |
| Ni | Balance plus incidental impurities; |
| or | |
| B) | |
| C | 0.01 max |
| Si | 9.8–10.3 |
| Cr | 18.5–19.5 |
| B | 0.03 max |
| Ni | Balance plus incidental impurities. |

* * * * *